United States Patent
Park et al.

(10) Patent No.: US 10,595,344 B2
(45) Date of Patent: Mar. 17, 2020

(54) METHOD AND DEVICE FOR TRANSMITTING OR RECEIVING MULTICASTING CONTROL CHANNEL FOR BANDWIDTH REDUCED LOW COMPLEXITY / COVERAGE ENHANCEMENT (BL/CE) TERMINAL

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 71 days.

(21) Appl. No.: 15/675,014

(22) Filed: Aug. 11, 2017

(65) Prior Publication Data

US 2018/0049247 A1 Feb. 15, 2018

(30) Foreign Application Priority Data

Aug. 12, 2016 (KR) .................. 10-2016-0103189
Jun. 27, 2017 (KR) .................. 10-2017-0081324

(51) Int. Cl.
*H04W 74/08* (2009.01)
*H04L 5/00* (2006.01)
(Continued)

(52) U.S. Cl.
CPC ........... *H04W 74/0833* (2013.01); *H04L 1/00* (2013.01); *H04L 1/1887* (2013.01);
(Continued)

(58) Field of Classification Search
CPC ..... H04W 74/0833; H04W 4/70; H04W 4/06; H04W 72/005; H04L 1/1887; H04L 5/0053; H04L 5/001; H04L 1/00
(Continued)

(56) References Cited

U.S. PATENT DOCUMENTS

2012/0078933 A1 3/2012 Kim et al.
2014/0204825 A1 7/2014 Ekpenyong et al.
(Continued)

FOREIGN PATENT DOCUMENTS

WO 2018/028038 A1 2/2018

OTHER PUBLICATIONS

Ericsson, "Definition of number of MPDCCH repetitions for BL/CE UE", R1-165392, 3GPP TSG-RAN1 Meeting #85, Nanjing, China, May 23-27, 2016, pp. 44-50.
(Continued)

*Primary Examiner* — Mong-Thuy T Tran
(74) *Attorney, Agent, or Firm* — IP Legal Services, LLC

(57) ABSTRACT

Provided are a method of supporting Single Cell Point-to-Multi-point (SC-PTM) for a Bandwidth reduced Low complexity/Coverage Enhancement (BL/CE) terminal or an NB-IoT terminal, which is for a Machine Type Communication (MTC) application defined in a 3 GPP LTE/LTE-A system. The method may include receiving configuration information relating to an MPDCCH search space from a base station, wherein the MPDCCH search space is separately configured to receive scheduling control information for the multicasting control channel; receiving the scheduling control information for the multicasting control channel through the MPDCCH search space configured based on the configuration information; and receiving the multicasting control channel based on the scheduling control information, wherein the configuration information is received through higher layer signaling.

8 Claims, 20 Drawing Sheets

Table 9.1.5-1a: MPDCCH candidates monitored by a BL/CE UE
(CEModeA, MPDCCH-PRB-set size = 2PRBs or 4PRBs)

| $N'^{X_p}_{RB}$ | R | $M'^{(L')}_p$ | | | | |
|---|---|---|---|---|---|---|
| | | L'=2 | L'=4 | L'=8 | L'=16 | L'=24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

(51) Int. Cl.
  *H04L 1/00* (2006.01)
  *H04W 4/70* (2018.01)
  *H04L 1/18* (2006.01)
  *H04W 4/06* (2009.01)
  *H04W 72/00* (2009.01)

(52) U.S. Cl.
  CPC ............ *H04L 5/0053* (2013.01); *H04W 4/06* (2013.01); *H04W 4/70* (2018.02); *H04L 5/001* (2013.01); *H04W 72/005* (2013.01)

(58) Field of Classification Search
  USPC ........................................................ 455/434
  See application file for complete search history.

(56) References Cited

U.S. PATENT DOCUMENTS

| | | | | |
|---|---|---|---|---|
| 2016/0309282 | A1* | 10/2016 | Xu | H04W 24/08 |
| 2017/0353946 | A1 | 12/2017 | Rico Alvarino et al. | |
| 2018/0019888 | A1* | 1/2018 | Rico Alvarino | H04W 4/70 |
| 2018/0048984 | A1* | 2/2018 | Park | H04W 4/70 |
| 2018/0048985 | A1* | 2/2018 | Park | H04W 4/70 |
| 2018/0049246 | A1* | 2/2018 | Park | H04W 4/70 |
| 2018/0069672 | A1* | 3/2018 | Horiuchi | H04L 5/0048 |
| 2018/0084561 | A1* | 3/2018 | Liu | H04L 1/00 |
| 2018/0103459 | A1* | 4/2018 | Liu | H04L 5/0057 |
| 2018/0167917 | A1* | 6/2018 | Suzuki | H04W 72/04 |
| 2018/0198677 | A1 | 7/2018 | Blankenship et al. | |
| 2018/0212736 | A1* | 7/2018 | Chatterjee | H04L 5/0048 |
| 2019/0007891 | A1* | 1/2019 | Xu | H04W 4/06 |
| 2019/0069277 | A1* | 2/2019 | Awad | H04L 5/0053 |
| 2019/0174510 | A1 | 6/2019 | Shin et al. | |
| 2019/0223197 | A1* | 7/2019 | Shin | H04W 72/1252 |
| 2019/0335428 | A1* | 10/2019 | Bendlin | H04L 5/0053 |

OTHER PUBLICATIONS

Huawei, "Summary of email discussion: [91#22][LTE/SC-PTM] Scheduling pattern, DRX and Change Notification", R2-154195, 3GPP TSG-RAN WG2 #91bis, Malmo, Sweden, Oct. 5-9, 2015, pp. 1-10.

Huawei, "Introduction of SC-PTM", R2-156302, 3GPP TSG-RAN WG2 Meeting #92, Anaheim, US, Nov. 16-20, 2015, pp. 1-35.

* cited by examiner

FIG.1

*SystemInformationBlockType20* information element

```
-- ASN1START

SystemInformationBlockType20-r13 ::=  SEQUENCE {
    sc-mcch-RepetionPeriod-r13      ENUMERATED {rf2, rf4, rf8, rf16, rf32, rf64, rf128, rf256},
    sc-mcch-Offset-r13              INTEGER (0..10),
    sc-mcch-FirstSubframe-r13       INTEGER (0..9),
    sc-mcch-duration-r13            INTEGER (2..9) OPTIONAL,
    sc-mcch-ModificationPeriod-r13  ENUMERATED {rf2, rf4, rf8, rf16, rf32, rf64, rf128, rf256,
                                        rf512, rf1024, r2048, rf4096, rf8192, rf16384, rf32768,
                                        rf65536},
    lateNonCriticalExtension        OCTET STRING                OPTIONAL,
    ...
}

-- ASN1STOP
```

FIG.2

| SystemInformationBlockType20 field descriptions |
| --- |
| *sc-mcch-ModificationPeriod* |
| Defines periodically appearing boundaries, i.e. radio frames for which SFN mod *sc-mcch-ModificationPeriod* = 0. The contents of different transmissions of SC-MCCH information can only be different if there is at least one such boundary in-between them. Value rf2 corresponds to 2 radio frames, value rf4 corresponds to 4 radio frames and so on. |
| *sc-mcch-duration* |
| Indicates, starting from the subframe indicated by *sc-mcch-FirstSubframe*, the duration in subframes during which SC-MCCH may be scheduled in PDCCH sub-frames, see TS 36.321 [6]. Absence of this IE means that SC-MCCH is only scheduled in the subframe indicated by *sc-mcch-FirstSubframe*. |
| *sc-mcch-Offset* |
| Indicates, together with the *sc-mcch-RepetitionPeriod*, the radio frames in which SC-MCCH is scheduled i.e. SC-MCCH is scheduled in radio frames for which: SFN mod sc-*mcch-RepetitionPeriod* = *sc-mcch-Offset*. |
| *sc-mcch-FirstSubframe* |
| Indicates the first subframe in which SC-MCCH is scheduled |
| *sc-mcch-RepetitionPeriod* |
| Defines the interval between transmissions of SC-MCCH information, in radio frames. Value rf2 corresponds to 2 radio frames, rf4 corresponds to 4 radio frames and so on. |

*FIG.3*

*Table 7.1-4: PDCCH and PDSCH configured by G-RNTI or SC-RNTI*

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

FIG.4

Table 7.1-4A: PDCCH configured by SC-N-RNTI

| DCI format | Search Space |
|---|---|
| DCI format 1C | Common |

FIG.5

Table 9.1.5-1a: MPDCCH candidates monitored by a BL/CE UE
(CEModeA, MPDCCH-PRB-set size – 2PRBs or 4PRBs)

| $N'^{X_p}_{RB}$ | R | $M'^{(L')}_p$ | | | | |
|---|---|---|---|---|---|---|
| | | L'=2 | L'=4 | L'=8 | L'=16 | L'=24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

FIG.6

Table 9.1.5-1b: MPDCCH candidates monitored by a BL/CE UE
(CEModeA, MPDCCH-PRB-set size – 2+4PRBs)

| MPDCCH PRB set | R | $M'^{(L')}_p$ | | | | |
|---|---|---|---|---|---|---|
| | | L'=2 | L'=4 | L'=8 | L'=16 | L'=24 |
| 2 PRB set in 2+4 PRB set | r1 | 1 | 1 | 0 | 0 | 0 |
| 4 PRB set in 2+4 PRB set | | 0 | 0 | 2 | 1 | 0 |
| Both PRB sets in 2+4 PRB set | | 0 | 0 | 0 | 0 | 1 |
| 2 PRB set in 2+4 PRB set | r2 | 0 | 1 | 1 | 0 | 0 |
| 4 PRB set in 2+4 PRB set | | 0 | 0 | 2 | 1 | 0 |
| Both PRB sets in 2+4 PRB set | | 0 | 0 | 0 | 0 | 1 |
| 2 PRB set in 2+4 PRB set | r3 | 0 | 0 | 0 | 0 | 0 |
| 4 PRB set in 2+4 PRB set | | 0 | 0 | 1 | 1 | 0 |
| Both PRB sets in 2+4 PRB set | | 0 | 0 | 0 | 0 | 1 |
| 2 PRB set in 2+4 PRB set | r4 | 0 | 0 | 0 | 0 | 0 |
| 4 PRB set in 2+4 PRB set | | 0 | 0 | 0 | 0 | 0 |
| Both PRB sets in 2+4 PRB set | | 0 | 0 | 0 | 0 | 1 |

FIG. 7

Table 9.1.5-2a: MPDCCH candidates monitored by a BL/CE UE (CEModeB, MPDCCH-PRB-set size – 2PRBs or 4PRBs)

| $N'^{X_p}_{RB}$ | R | $M'^{(L')}_p$ | | | | |
|---|---|---|---|---|---|---|
| | | L'=2 | L'=4 | L'=8 | L'=16 | L'=24 |
| 2 | r1 | 0 | 0 | 1 | 0 | 0 |
| 4 | | 0 | 0 | 1 | 1 | 0 |
| 2 | r2 | 0 | 0 | 1 | 0 | 0 |
| 4 | | 0 | 0 | 1 | 1 | 0 |
| 2 | r3 | 0 | 0 | 1 | 0 | 0 |
| 4 | | 0 | 0 | 1 | 1 | 0 |
| 2 | r4 | 0 | 0 | 1 | 0 | 0 |
| 4 | | 0 | 0 | 1 | 1 | 0 |

FIG. 8

Table 9.1.5-2b: MPDCCH candidates monitored by a BL/CE UE
(CEModeB, MPDCCH-PRB-set size – 2+4PRBs)

| MPDCCH PRB set | R | $M'^{(L')}_p$ | | | | |
|---|---|---|---|---|---|---|
| | | L'=2 | L'=4 | L'=8 | L'=16 | L'=24 |
| 2 PRB set in 2+4 PRB set | r1 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r2 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r3 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r4 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |

FIG.9

*Table 9.1.5-3: Determination of repetition levels*

| $r_{max}$ | $r1$ | $r2$ | $r3$ | $r4$ |
|---|---|---|---|---|
| 1 | 1 | – | – | – |
| 2 | 1 | 2 | – | – |
| 4 | 1 | 2 | 4 | – |
| >=8 | $r_{max}/8$ | $r_{max}/4$ | $r_{max}/2$ | $r_{max}$ |

FIG.10

Table 9.1.5-4: Repetition levels for Type1-MPDCCH common search space

| $r_{max}$ | $r1$ | $r2$ | $r3$ | $r4$ |
|---|---|---|---|---|
| 256 | 2 | 16 | 64 | 256 |
| 128 | 2 | 16 | 64 | 128 |
| 64 | 2 | 8 | 32 | 64 |
| 32 | 1 | 4 | 16 | 32 |
| 16 | 1 | 4 | 8 | 16 |
| 8 | 1 | 2 | 4 | 8 |
| 4 | 1 | 2 | 4 | – |
| 2 | 1 | 2 | – | – |
| 1 | 1 | – | – | – |

FIG.11

Table 9.1.5-5: Mapping for DCI subframe repetition number

| R | DCI subframe repetition number |
|---|---|
| r1 | 00 |
| r2 | 01 |
| r3 | 10 |
| r4 | 11 |

FIG. 12

Table 16.6-1: NPDCCH UE-specific search space candidates

| $R_{max}$ | $R$ | NCCE indices of monitored NPDCCH candidates | |
|---|---|---|---|
| | | $L'=1$ | $L'=2$ |
| 1 | 1 | {0},{1} | {0,1} |
| 2 | 1 | {0},{1} | {0,1} |
| | 2 | – | {0,1} |
| 4 | 1 | – | {0,1} |
| | 2 | – | {0,1} |
| | 4 | – | {0,1} |
| >=8 | $R_{max}/8$ | – | {0,1} |
| | $R_{max}/4$ | – | {0,1} |
| | $R_{max}/2$ | – | {0,1} |
| | $R_{max}$ | – | {0,1} |

Note 1: {x}, {y} denotes NPDCCH Format 0 candidate with NCCE index 'x', and NPDCCH Format 0 candidate with NCCE index 'y' are monitored Note 2: {x,y} denotes NPDCCH Format1 candidate corresponding to NCCEs 'x' and 'y' is monitored.

FIG.13

*Table 16.6-2: Type 1- NPDCCH common search space candidates*

| $R_{max}$ | R | NCCE indices of monitored NPDCCH candidates | |
|---|---|---|---|
| | | L'=1 | L'=2 |
| 1 | 1 | – | {0,1} |
| 2 | 1,2 | – | {0,1} |
| 4 | 1,2,4 | – | {0,1} |
| 8 | 1,2,4,8 | – | {0,1} |
| 16 | 1,2,4,8,16 | -- | {0,1} |
| 32 | 1,2,4,8,16,32 | – | {0,1} |
| 64 | 1,2,4,8,16,32,64 | – | {0,1} |
| 128 | 1,2,4,8,16,32,64,128 | – | {0,1} |
| 256 | 1,4,8,16,32,64,128,256 | – | {0,1} |
| 512 | 1,4,16,32,64,128,256,512 | – | {0,1} |
| 1024 | 1,8,32,64,128,256,512,1024 | – | {0,1} |
| 2048 | 1,8,64,128,256,512,1024,2048 | – | {0,1} |
| Note 1: | {x}, {y} denotes NPDCCH Format 0 candidate with NCCE index 'x', and NPDCCH Format 0 candidate with NCCE index 'y' are monitored | | |
| Note 2: | {x,y} denotes NPDCCH Format1 candidate corresponding to NCCEs 'x' and 'y' is monitored. | | |

FIG.14

Table 16.6-3: Type 2- NPDCCH common search space candidates

| $R_{max}$ | $R$ | NCCE indices of monitored NPDCCH candidates | |
|---|---|---|---|
| | | $L'=1$ | $L'=2$ |
| 1 | 1 | – | {0,1} |
| 2 | 1 | – | {0,1} |
| | 2 | – | {0,1} |
| 4 | 1 | – | {0,1} |
| | 2 | – | {0,1} |
| | 4 | – | {0,1} |
| >=8 | $R_{max}/8$ | – | {0,1} |
| | $R_{max}/4$ | – | {0,1} |
| | $R_{max}/2$ | – | {0,1} |
| | $R_{max}$ | – | {0,1} |
| Note 1: {x}, {y} denotes NPDCCH Format 0 candidate with NCCE index 'x', and NPDCCH Format 0 candidate with NCCE index 'y' are monitored | | | |
| Note 2: {x,y} denotes NPDCCH Format1 candidate corresponding to NCCEs 'x' and 'y' is monitored. | | | |

METHOD AND DEVICE FOR TRANSMITTING OR RECEIVING MULTICASTING CONTROL CHANNEL FOR BANDWIDTH REDUCED LOW COMPLEXITY / COVERAGE ENHANCEMENT (BL/CE) TERMINAL

CROSS REFERENCE TO RELATED APPLICATION

This application claims priority from Korean Patent Application Nos. 10-2016-0103189 & 10-2017-0081324, filed on Aug. 12, 2016 & Jun. 27, 2017, which are hereby incorporated by reference for all purposes as if fully set forth herein.

BACKGROUND OF THE INVENTION

1. Field of the Invention

The present embodiments relate to a method of supporting a Single Cell Point-to-Multipoint (SC-PTM) for a Bandwidth reduced Low complexity/Coverage Enhancement (BL/CE) terminal for a Machine Type Communication (MTC) application defined in a third generation group project partnership (3GPP) long term evolution (LTE)/LTE-Advanced system.

2. Description of the Prior Art

In 3GPP Release-12/13, a Bandwidth Reduced Low complexity (BL) terminal technology and a Coverage Enhancement (CE) terminal technology have been standardized. A Low Complexity (LC) terminal represents a terminal targeting low-end application having a low profit, a low speed, and a low latency sensitivity, such as some Machine Type Communication (MTC) terminals. The LC terminal has reduced Tx and Rx capabilities compared to terminals of other categories. A BL terminal operates in an LTE system band having a limited channel bandwidth of 6 PRB corresponding to a maximum channel bandwidth available in a 1.4 MHz LTE system. A CE terminal needs an enhanced coverage function to connect to a cell.

In 3GPP Release-13, Narrowband Internet of Things (NB-IoT) technology has been standardized. The aspect thereof is to specify a wireless access for cellular IoT, and includes improved indoor coverage, support for large-scale low-speed terminals, low latency sensitivity, very low cost of terminals, low power consumption, and optimized network architecture.

In Release-13, a BL/CE terminal or an NB-IoT terminal has been provided with functions for enabling the 3GPP system to rapidly penetrate into a low-cost IoT market. Accordingly, some functions provided to a typical LTE terminal that provides a mobile broadband service are not provided to the BL/CE terminal or the NB-IoT terminal.

For example, multicast transmission (an MBMS service or SC-PTM transmission) provided to a typical LTE terminal is not provided to a Release-13 BL/CE terminal or a Release-13 NB-IoT terminal. Therefore, there is no method defined for supporting multicast transmission of a BL/CE terminal or an NB-IoT terminal in Release-13.

SUMMARY OF THE INVENTION

An aspect of the present embodiments is to provide a method of configuring a search space of a downlink control channel capable of supporting multicasting control channel transmission for a BL/CE terminal.

In an aspect, the present embodiments provide a method of receiving a multicasting control channel (SC-MCCH) by a Bandwidth reduced Low complexity/Coverage Enhancement (BL/CE) terminal, the method including: receiving configuration information relating to a machine type communication physical downlink control channel (MPDCCH) search space from a base station, wherein the MPDCCH search space is separately configured to receive scheduling control information for the multicasting control channel; receiving the scheduling control information for the multicasting control channel through the MPDCCH search space configured based on the configuration information; and receiving the multicasting control channel based on the scheduling control information, in which the configuration information is received through higher layer signaling.

In another aspect, the present embodiments provide a method of transmitting a multicasting control channel for a BL/CE terminal, the method including: configuring a separate MPDCCH search space for transmitting scheduling control information for the multicasting control channel; transmitting the scheduling control information for the multicasting control channel through the MPDCCH search space; and transmitting the multicasting control channel based on the scheduling control information, in which configuration information relating to the MPDCCH search space is transmitted through higher layer signaling.

In still another aspect, the present embodiments provide a BL/CE terminal that receives a multicasting control channel, the BL/CE terminal including: a reception unit that receives configuration information relating to an MPDCCH search space from a base station, wherein the MPDCCH search space is separately configured to receive scheduling control information for the multicasting control channel; and a control unit that checks the scheduling control information for the multicasting control channel through the MPDCCH search space configured based on the configuration information, and controls reception of the multicasting control channel based on the scheduling control information, in which the configuration information is received through higher layer signaling.

In still another aspect, the present embodiments provide a base station that transmits a multicasting control channel for a BL/CE terminal, the base station including: a control unit that configures a separate MPDCCH search space for transmitting scheduling control information for the multicasting control channel, and controls transmission of the scheduling control information for the multicasting control channel through the MPDCCH search space; and a transmission unit that transmits the multicasting control channel based on the scheduling control information.

According to the present embodiments, it is possible to support multicasting control channel transmission for a BL/CE terminal by configuring a separate downlink control channel search space for transmitting or receiving scheduling control information for a multicasting control channel.

BRIEF DESCRIPTION OF THE DRAWINGS

The above and other objects, features and advantages of the present disclosure will be more apparent from the following detailed description taken in conjunction with the accompanying drawings, in which:

FIG. 1 and FIG. 2 are diagrams illustrating a system information block in which a base station broadcasts information for enabling a terminal to receive SC-MCCH information;

FIG. 3 is a diagram illustrating a PDCCH and a PDSCH, configured by a G-RNTI or an SC-RNTI, in relation to a search space of a terminal to which SC-PTM is applied;

FIG. 4 is a diagram illustrating a PDCCH configured by an SC-N-RNTI in relation to search space of a terminal to which SC-PTM is applied;

FIG. 5 to FIG. 8 are diagrams illustrating an MPDCCH candidate monitored by a BL/CE terminal in relation to an MPDCCH search space;

FIG. 9 is a diagram illustrating determination of a repetition level in relation to an MPDCCH search space;

FIG. 10 is a diagram illustrating a repetition level for a Type1-MPDCCH common search space in relation to an MPDCCH search space;

FIG. 11 is a diagram illustrating mapping for a DCI subframe repetition number in relation to an MPDCCH search space;

FIG. 12 is a diagram illustrating an NPDCCH terminal-specific search space candidate in relation to an NPDCCH search space;

FIG. 13 is a diagram illustrating a Type1-NPDCCH common search space candidate in relation to an NPDCCH search space;

FIG. 14 is a diagram illustrating a Type2-NPDCCH common search space candidate in relation to an NPDCCH search space;

DETAILED DESCRIPTION OF THE EXEMPLARY EMBODIMENTS

Figure 15:
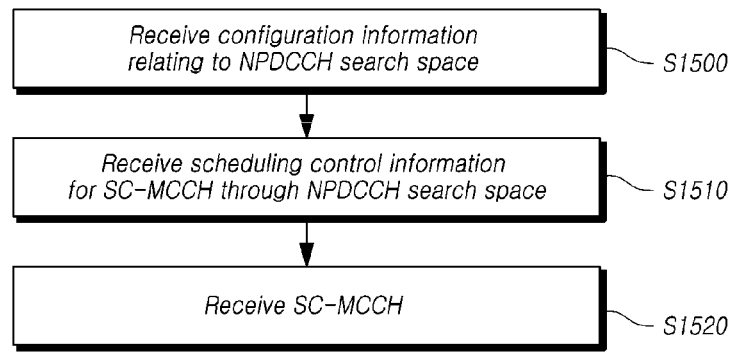
FIG. 15 and FIG. 16 are diagrams illustrating a method of transmitting or receiving a multicasting control channel for an NB-IoT terminal.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specification, an MTC terminal may refer to a terminal supporting low cost (or low complexity), a terminal supporting coverage enhancement, or the like. In the present specification, an MTC terminal may refer to a terminal supporting low cost (or low complexity), coverage enhancement, and the like. Alternatively, in the present specification, an MTC terminal refers to a terminal that is defined to be in a predetermined category for supporting low costs (or low complexity) and/or coverage enhancement.

In other words, in the present specification, an MTC terminal may refer to a newly defined 3GPP Release-13 low cost (or low complexity) UE category/type, which performs LTE-based MTC related operations. Alternatively, in the present specification, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type.

The wireless communication system of the present disclosure may be widely installed so as to provide various communication services, such as a voice service, packet data, and the like. The wireless communication system may include a User Equipment (UE) and a Base Station (BS or an eNB). Throughout the specification, the user equipment may be an inclusive concept indicating a user terminal utilized in wireless communication, including a User Equipment (UE) in WCDMA, LTE, HSPA, and the like, and a Mobile station (MS), a User Terminal (UT), a Subscriber Station (SS), a wireless device, and the like in GSM.

A base station or a cell may generally refer to a station where communication with a user equipment is performed, and may also be referred to as other terms including a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, in the present specification, the base station or the cell may be construed as an inclusive concept indicating a function or a portion of an area covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, and communication ranges of a relay node, an RRH, an RU, a small cell, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission or reception point, a transmission point, a reception point, and the like may be embodiments of a base station. In ii), a wireless area itself that receives or transmits a signal from a perspective of a user equipment or a neighboring base station, may be indicated as a base station.

Therefore, a megacell, a macrocell, a microcell, a picocell, a femtocell, a small cell, an RRH, an antenna, an RU, an LPN, a point, an eNB, a transmission or reception point, a transmission point, and a reception point are commonly referred to as a base station.

In the present specification, a user equipment and a base station are used as two inclusive transceiving subjects to embody the technology and technical concepts described in the specification, and may not be limited to a predetermined term or word. In the specification, a user equipment and a base station are used as two (uplink or downlink) inclusive transceiving subjects to embody the technology and technical concepts described in the specification, and may not be limited to a predetermined term or word. Here, Uplink (UL) refers to a scheme for a UE to transmit data to or receive data from a base station, and Downlink (DL) refers to a scheme for a base station to transmit data to and receive data from a UE.

Various multiple access schemes may be unrestrictedly applied to the wireless communication system. Various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, so as to transmit data.

Control information may be transmitted using an enhanced PDCCH or extended PDCCH (EPDCCH).

In the present specification, a cell may refer to the coverage of a signal transmitted from a transceiving point, a component carrier having the coverage of the signal transmitted from the transceiving point (transmission point, or transmission or reception point), or the transceiving point itself.

A wireless communication system, according to embodiments, refers to a Coordinated Multi-point transmission or reception (CoMP) system where two or more transmission or reception points cooperatively transmit a signal, a coordinated multi-antenna transmission system, or a coordinated multi-cell communication system. A CoMP system may include at least two multi-transmission or reception points and terminals.

A multi-transmission or reception point may be a base station or a macro cell (hereinafter, referred to as an "eNB") and at least one RRH that is connected to the eNB through an optical cable or an optical fiber and is wirely controlled, and has a high transmission power or a low transmission power within a macro cell area.

Hereinafter, a downlink refers to communication or a communication path from a multi-transmission or reception point to a terminal, and an uplink refers to communication or a communication path from a terminal to a multi-transmission or reception point. In a downlink, a transmitter may be a part of a multiple transmission or reception point and a receiver may be a part of a terminal. In an uplink, a transmitter may be a part of a terminal and a receiver may be a part of a multiple transmission or reception point.

Hereinafter, the situation in which a signal is transmitted or received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an radio resource control (RRC) signaling that transmits RRC information including an RRC parameter.

An eNB performs downlink transmission to terminals. The eNB may transmit a Physical Downlink Shared Channel (PDSCH) which is a primary physical channel for unicast transmission. The eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission or reception of a signal through each channel will be described as transmission or reception of a corresponding channel.

In 3GPP Release-12/13, a Bandwidth Reduced Low complexity (BL) terminal technology and a Coverage Enhancement (CE) terminal technology have been standardized. A Low Complexity (LC) terminal represents a terminal targeting low-end application having a low profit, a low speed, and a low latency sensitivity, such as some Machine Type Communication (MTC) terminals. The LC terminal has reduced Tx and Rx capabilities compared to terminals of other categories. A BL terminal operates in an LTE system band having a limited channel bandwidth of 6 PRB corresponding to a maximum channel bandwidth available in a 1.4 MHz LTE system. A CE terminal needs an enhanced coverage function to connect to a cell.

In 3GPP Release-13, Narrowband Internet of Things (NB-IoT) technology has been standardized. The aspect thereof is to specify a wireless access for cellular IoT, and includes improved indoor coverage, support for large-scale low-speed terminals, low latency sensitivity, very low cost of terminals, low power consumption, and optimized network architecture.

In Release-13, a BL/CE terminal or an NB-IoT terminal has been provided with functions for enabling the 3GPP system to rapidly penetrate into a low-cost IoT market. Accordingly, some functions provided to a general LTE terminal that provides a mobile broadband service are not provided to the BL/CE terminal or the NB-IoT terminal. For example, multicast transmission (an MBMS service or SC-PTM transmission) provided to a general LTE terminal is not provided to an Release-13 BL/CE terminal or an Release-13 NB-IoT terminal. Hereinafter, descriptions will be provided based on SC-PTM for ease of description, but MBSFN transmission is also included in the scope of the present disclosure.

In LTE, MBMS transmission uses one of MBSFN transmission and SC-PTM transmission. MCE determines whether to use SC-PTM or MBSFN for each MBMS session. SC-PTM corresponds to MBMS transmission in a single-cell coverage. In SC-PTM, an SC-MCCH, i.e., a control channel, and SC-MTCH(s), i.e., one or more traffic channels, are provided. The SC-MCCH, i.e., a control channel and the SC-MTCH(s), i.e., one or more traffic channels are mapped on a DL-SCH (i.e., a PDSCH).

According to the prior art, a terminal can identify SC-MCCH transmission on a PDCCH by using an SC-RNTI. Here, the SC-MCCH indicates a control channel for transmitting control information associated with MBMS transmission by using SC-PTM or the control information. The SC-MCCH uses a modification period. A notification mechanism is used to announce a change of the SC-MCCH due to a start of a session. The notification is transmitted within a first sub-frame in a repetition period in which the SC-MCCH may be scheduled. The notification is transmitted using a DCI format 1C with a Single Cell Notification RNTI (SC-N-RNTI) and one bit within an 8-bit bitmap. When the terminal receives the notification, the SC-MCCH is acquired in the same subframe. The terminal detects a change of the SC-MCCH, which is not announced by the notification mechanism, through SC-MCCH monitoring in the modification period.

[SC-PTM]

A terminal configured with an MBMS service through an SC-MRB may acquire timing information for SC-MCCH information acquisition through SystemInformationBlockType20 (SIB20).

According to the related art, a terminal searches for a common search space on a PDCCH by using a Single Cell RNTI (SC-RNTI). Thus, the terminal receives PDSCH resource allocation information for SC-MCCH transmission and receives SC-MCCH information through a corresponding PDSCH based on the received PDSCH resource allocation information. A base station broadcasts information for enabling the terminal to receive the SC-MCCH information through the SIB20. Information included in the SIB20 includes sc-mcch-RepetitionPeriod information defining an interval between SC-MCCH information transmissions, sc-mcch-Offset indicating a radio frame in which the SC-MCCH is scheduled, sc-mcch-FirstSubframe information indicating a first subframe in which the SC-MCCH is scheduled, and sc-mcch-duration information indicating a duration in which the SC-MCCH may be scheduled starting from the subframe indicated by sc-mcch-FirstSubframe. A detailed definition of this will be provided in the following excerpts from TS36.331.

TS36.331

SystemInformationBlockType20

The IE SystemInformationBlockType20 illustrated in FIG. 1 and FIG. 2 contains the information required to acquire the control information associated transmission of MBMS using SC-PTM.

[Search Space for SC-PTM]

As described above, control information (SC-MCCH) and data information (SC-MTCH) for a terminal to which the SC-PTM is applied are individually transmitted through a PDSCH, and corresponding PDSCH resource allocation information is individually transmitted through a common search space of a PDCCH, in which the control information (SC-MCCH) is CRC-scrambled by an SC-RNTI and transmitted, and the data information (SC-MTCH) is CRC-scrambled by a G-RNTI and transmitted. Further, change notification-related bitmap information for notifying of a change of the SC-MCCH is CRC-scrambled by an SC-N-RNTI and transmitted through a PDCCH common search space.

In this regard, detailed descriptions associated with a terminal search space for SC-PTM and related DCI format configuration will be provided in the following excerpts from TS36.213.

TS36.213

If a UE is configured by higher layers to decode PDCCH with CRC scrambled by the G-RNTI or SC-RNTI, the UE shall decode the PDCCH and the corresponding PDSCH according to any of the combinations defined in Table 7.1-4 in FIG. 3. The scrambling initialization of PDSCH corresponding to these PDCCHs is by G-RNTI or SC-RNTI.

If a UE is configured by higher layers to decode PDCCH with CRC scrambled by the SC-N-RNTI, the UE shall decode the PDCCH according to the combination defined in table 7.1-4A in FIG. 4.

[MPDCCH Search Space Configuration]

Four search spaces are defined as MPDCCH search spaces for a Rel-13 BL/CE terminal. A type-0 common search space is defined to perform monitoring only when the terminal is configured with CEModeA. Further, a type-1 common search space is defined for paging, a type-2 common search space is defined for a random access procedure, and a UE-specific search space is defined for UE-specific data transmission or reception.

Detailed descriptions associated with the MPDCCH search space configuration will be provided in the following excerpts from TS36.213.

TS36.213

9.1.5 MPDCCH Assignment Procedure

A BL/CE UE shall monitor a set of MPDCCH candidates on one or more Narrowbands (described in subclause 5.2.4 of [3]) as configured by higher layer signalling for control information, where monitoring implies attempting to decode each of the MPDCCHs in the set according to all the monitored DCI formats. The Narrowband in a subframe used for MPDCCH monitoring is determined as described in [3].

A UE that is not a BL/CE UE is not required to monitor MPDCCH.

Higher layer signalling can configure a BL/CE UE with one or two MPDCCH-PRB-sets for MPDCCH monitoring. The PRB-pairs corresponding to an MPDCCH-PRB-set are indicated by higher layers. Each MPDCCH-PRB-set consists of set of ECCEs numbered from 0 to $N'_{ECCE_{p,k}}-1$ where $N'_{ECCE_{p,k}}$ is the number of ECCEs in MPDCCH-PRB-set p of subframe k. The MPDCCH-PRB-set(s) can be configured by higher layers for either localized MPDCCH transmission or distributed MPDCCH transmission. The set of MPDCCH candidates to monitor are defined in terms of MPDCCH search spaces. The BL/CE UE shall monitor one or more of the following search spaces a Type0-MPDCCH common search space if configured with CEmodeA, a Type1-MPDCCH common search space, a Type2-MPDCCH common search space, and a MPDCCH UE-specific search space.

A BL/CE UE configured with CEModeB is not required to monitor Type0-MPDCCH common search space.

The BL/CE UE is not required to simultaneously monitor MPDCCH UE-specific search space and Type1-MPDCCH common search space.

The BL/CE UE is not required to simultaneously monitor MPDCCH UE-specific search space and Type2-MPDCCH common search space.

A BL/CE UE is not expected to monitor an MPDCCH candidate, if an ECCE corresponding to that MPDCCH candidate is mapped to a PRB pair that overlaps with a transmission of PDSCH scheduled previously in the same subframe. For aggregation level L'=24 or L'=12 ECCEs, the number of ECCEs refers to the MPDCCH mapping to the REs of the 2+4 PRB set as defined in [3]. An MPDCCH search space $MS_k^{(L',R)}$ at aggregation level $L' \in \{1,2,4,8,16,12,24\}$ and repetition level $R \in \{1,2,4,8,16,32,64,128,256\}$ is defined by a set of MPDCCH candidates where each candidate is repeated in a set of R consecutive BL/CE downlink subframes starting with subframe k. For an MPDCCH-PRB-set p, the ECCEs corresponding to MPDCCH candidate m of the search space $$MS_k^{(L',R)}$$

are given by $$L\left\{\left(Y_{p,k} + \left\lfloor \frac{m \cdot N'_{ECCE,p,k}}{L \cdot M_p'^{(L')}} \right\rfloor\right) \bmod \lfloor N'_{ECCE,p,k}/L' \rfloor\right\} + i$$

where $i=0,\ldots,L'-1$ $m=0,1,\ldots,M_p'^{(L')}-1$ $M'_p{}^{(L')}$ is the number of MPDCCH candidates to monitor at aggregation level L' in MPDCCH-PRB-set p in each subframe in the set of R consecutive subframes.

$Y_{p,k}$ for MPDCCH UE-specific search space is determined as described in subclause 9.1.4, and $Y_{p,k}=0$ for Type0-MPDCCH common search space, Type1-MPDCCH common search space and Type2-MPDCCH common search space.

A BL/CE UE is not expected to monitor MPDCCH in subframes that are not BL/CE DL subframes.

Until BL/CE UE receives higher layer configuration of MPDCCH UE-specific search space, the BL/CE UE monitors MPDCCH according to the same configuration of MPDCCH search space and Narrowband as that for MPDCCH scheduling Msg4.

The aggregation and repetition levels defining the MPDCCH search spaces and the number of monitored MPDCCH candidates are given as follows:
  For MPDCCH UE-specific search space
  if the BL/CE UE is configured with $$N_{RB}'^{X_p} = 2 \text{ or } N_{RB}'^{X_p} = 4$$

PRB-pairs, and mPDCCH–NumRepetition=1, and
if the MPDCCH-PRB-set is configured for distributed transmission, the aggregation levels defining the search spaces and the number of monitored MPDCCH candidates are listed in Table 9.1.4-1a and Table 9.1.4-1b, where L is substituted with L' for L≤24, and $$N_{RB}^{X_p}$$

is substituted with $$N_{RB}^{X_p}.$$

if the MPDCCH-PRB-set is configured for localized transmission, the aggregation levels defining the search spaces and the number of monitored MPDCCH candidates are listed in Table 9.1.4-2a and Table 9.1.4-2b, where L is substituted with L' and $$N_{RB}^{X_p}$$

is substituted with $$N_{RB}^{X_p}.$$

otherwise
if the UE is configured with CEModeA, and $$N_{RB}'^{X_p} = 2 \text{ or } N_{RB}'^{X_p} = 4,$$

the aggregation and repetition levels defining the search spaces and the number of monitored MPDCCH candidates are listed in Table 9.1.5-1a in FIG. 5
if the UE is configured with CEModeA, and $$N_{RB}'^{X_p} = 2 + 4,$$

the aggregation and repetition levels defining the search spaces and the number of monitored MPDCCH candidates are listed in Table 9.1.5-1b in FIG. 6
if the UE is configured with CEModeB, and $$N_{RB}'^{X_p} = 2 \text{ or } N_{RB}'^{X_p} = 4$$

the aggregation and repetition levels defining the search spaces and the number of monitored MPDCCH candidates are listed in Table 9.1.5-2a in FIG. 7
if the UE is configured with CEModeB, and $$N_{RB}'^{X_p} = 2 + 4,$$

the aggregation and repetition levels defining the search spaces and the number of monitored MPDCCH candidates are listed in Table 9.1.5-2b in FIG. 8

$$N_{RB}'^{X_p}$$

is the number of PRB-pairs configured for MPDCCH UE-specific search space. When $$N_{RB}'^{X_p} = 2 + 4$$

it is given by the higher layer parameter numberPRB-Pairs-r13, and when $$N'^{X_p}_{RB} = 2 \text{ or } N'^{X_p}_{RB} = 4,$$

it is given by the higher layer parameter numberPRB-Pairs-r11.

r1, r2, r3, r4 are determined from Table 9.1.5-3 in FIG. 9 by substituting the value of $r_{max}$ with the value of higher layer parameter mPDCCH-NumRepetition.

The PRB-pairs within a Narrowband corresponding to an MPDCCH-PRB-set are indicated by higher layers and are determined using the description given in subclause 9.1.4.4.

If higher layer configuration numberPRB-Pairs-r13 for MPDCCH-PRB-set p is 6, $$N'^{X_p}_{RB} = 2 + 4$$

and the number of PRB-pairs in an MPDCCH-PRB-set p=2+4.

If Type2-MPDCCH common search space,
  PRB-pairs of the 2 PRB set in the 2+4 PRB set correspond to PRB-pairs with the largest two PRB indices in MPDCCH-PRB-set p.
  PRB-pairs of the 4 PRB set in the 2+4 PRB set correspond to PRB-pairs with the smallest 4 PRB indices in MPDCCH-PRB-set p.
  PRB-pairs of the 2+4 PRB set in the 2+4 PRB set correspond to all PRB-pairs in MPDCCH-PRB-set p.

For Type0-MPDCCH common search space, the narrowband location and the MPDCCH-PRB-set p are the same as for MPDCCH UE-specific search space, and
if $$N'^{X_p}_{RB} = 2$$

$$M'^{(L')}_p = 1$$

for L'=8 and repetition levels r1, r2, r3, r4 given in Table 9.1.5.-3. For all other cases, $$M'^{(L')}_p = 0$$

if $$N'^{X_p}_{RB} = 4$$

$$M'^{(L')}_p = 1 \text{ for } L' = 16$$

and repetition levels r1, r2, r3, r4 given in Table 9.1.5.-3. For all other cases, $$M'^{(L')}_p = 0$$

if $$N'^{X_p}_{RB} = 2 + 4$$

$$M'^{(L')}_p = 1 \text{ for } L' = 24$$

and repetition levels r1, r2, r3, r4 given in Table 9.1.5.-3. For all other cases, $$M'^{(L')}_p = 0$$

For Type1-MPDCCH common search space, the number of PRB-pairs in MPDCCH-PRB-set p is 2+4 PRB-pairs, and $$M'^{(L')}_p = 1 \text{ for } L' = 24$$

and repetition levels r1, r2, r3, r4 where the repetition levels are determined from Table 9.1.5-4 in FIG. 10 by substituting the value of $r_{max}$ with higher layer parameter mPDCCH-NumRepetition-Paging.

For all other cases, $$M'^{(L')}_p = 0$$

For Type2-MPDCCH common search space, the number of PRB-pairs in MPDCCH-PRB-set p is 2+4 PRB-pairs, and
  If the most recent coverage enhancement level used for PRACH is coverage enhancement level 0 and 1, the aggregation and repetition levels defining the search spaces and the number of monitored MPDCCH candidates are determined from Table 9.1.5-1b, by assuming that the number of candidates for <8 as zero.
  If the most recent coverage enhancement level used for PRACH is coverage enhancement level 2 and 3, the aggregation and repetition levels defining the search spaces and the number of monitored MPDCCH candidates are determined from Table 9.1.5-2b.

where r1,r2,r3, r4 are determined from Table 9.1.5-3 by substituting the value of $r_{max}$ with the value of higher layer parameter mPDCCH-NumRepetition-RA.

In tables 9.1.5-1a, 9.1.5-1b, 9.1.5-2a, 9.1.5-2b, and for Type0, Type1, Type2 MPDCCH common search space, L' is applied for $$N^{ECCE}_{EREG} = 4,$$

and L" is applied for $$N^{ECCE}_{EREG} = 8$$

wherein L"=L'/2 substituting the values of L'.

For Type1-MPDCCH common search space and Type2-MPDCCH common search space, distributed MPDCCH transmission is used.

For MPDCCH UE-specific search space, Type0-common search space, and Type2-common search space locations of starting subframe k are given by k=$k_D$ where $k_D$ is the $b^{th}$ consecutive BL/CE DL subframe from subframe k0, and b=u·rj, and $$u = 0, 1, \ldots, \frac{r_{max}}{ri} - 1,$$

and j∈{1,2,3,4} where subframe k0 is a subframe satisfying the condition $$(10n_f + \lfloor n_s/Z \rfloor) \bmod T = 0 \text{ where } T = r_{max} \cdot G$$

For MPDCCH UE-specific search space, Type0-common search space is G given by the higher layer parameter mPDCCH-startSF-UESS, For Type2-common search space, G is given by the higher layer parameter mPDCCH-startSF-CSS-RA-r13

$r_{max}$ is given by higher layer parameter mPDCCH-Num-Repetition, and r1, r2, r3, r4 are given in Table 9.1.5-3.

A BL/CE UE is not expected to be configured with values of $r_{max}$ and G that result in non-integer values of T.

For Type1-common search space, k=k0 and is determined from locations of paging opportunity subframes, If SystemInformationBlockType1-BR or SI message is transmitted in one narrowband in subframe k, a BL/CE UE shall assume MPDCCH in the same narrowband in the subframe k is dropped.

The BL/CE UE is not required to monitor an MPDCCH search space if any ECCEs corresponding to any of its MPDCCH candidates occur within a frame before $n_f$=0 and also occur within frame $n_f$=0.

For MPDCCH UE-specific search space or for Type0-common search space if the higher layer parameter mPD-CCH-NumRepetition is set to 1; or for Type2-common search space if the higher layer parameter mPDCCH-Num-Repetition-RA is set to 1;

The BL/CE UE is not required to monitor MPDCCH
For TDD and normal downlink CP, in special subframes for the special subframe configurations 0 and 5 shown in Table 4.2-1 of [3]
For TDD and extended downlink CP, in special subframes for the special subframe configurations 0, 4 and 7 shown in Table 4.2-1 of [3];
Otherwise
The BL/CE UE is not required to monitor MPDCCH
For TDD, in special subframes, if the BL/CE UE is configured with CEModeB
For TDD and normal downlink CP, in special subframes for the special subframe configurations 0,1,2,5,6,7 and 9 shown in Table 4.2-1 of [3], if the BL/CE UE is configured with CEModeA
For TDD and extended downlink CP, in special subframes for the special subframe configurations 0, 4, 7, 8 and 9 shown in Table 4.2-1 of [3], if the BL/CE UE is configured with CEModeA.

The number of MPDCCH repetitions is indicated in the 'DCI subframe repetition number' field in the DCI according to the mapping in Table 9.1.5-5 in FIG. 11.

[NPDCCH Search Space Configuration]

Three search spaces are defined as narrowband physical downlink control channel (NPDCCH) search spaces for a Rel-13 NB-IoT terminal. A type-1 common search space is defined for paging, a type-2 common search space is defined for a random access procedure, and a UE-specific search space is defined for UE-specific data transmission or reception.

Detailed descriptions associated with NPDCCH search space configuration will be provided in the following excerpts from TS36.213.

TS36.213

16.6 Narrowband physical downlink control channel related procedures

A UE shall monitor a set of NPDCCH candidates (described in subclause 10.2.2.1 of [3]) as configured by higher layer signalling for control information, where monitoring implies attempting to decode each of the NPDCCHs in the set according to all the monitored DCI formats.

The set of NPDCCH candidates to monitor are defined in terms of NPDCCH search spaces.

The UE shall monitor one or more of the following search spaces
a Type1-NPDCCH common search space,
a Type2-NPDCCH common search space, and
a NPDCCH UE-specific search space.

A UE is not required to simultaneously monitor a NPDCCH UE-specific search space and a Type-1-NPDCCH common search space.

A UE is not required to simultaneously monitor a NPDCCH UE-specific search space and a Type2-NPDCCH common search space.

A UE is not required to simultaneously monitor a Type-1-NPDCCH common search space and a Type2-NPDCCH common search space.

An NPDCCH search space $$NS_k^{(L',R)}$$

at aggregation level L' ∈ {1,2} and repetition level R∈{1, 2,4,8,16,32,64,128,256,512,1024,2048} is defined by a set of NPDCCH candidates where each candidate is repeated in a set of R consecutive NB-IoT downlink subframes excluding subframes used for transmission of SI messages starting with subframe k.

For NPDCCH UE-specific search space, the aggregation and repetition levels defining the search spaces and the corresponding NPDCCH candidates are listed in Table 16.6-1 in FIG. 12 by substituting the value of $R_{max}$ with the higher layer configured parameter al-Repetition-USS.

For Type1-NPDCCH common search space, the aggregation and repetition levels defining the search spaces are listed in Table 16.6-2 in FIG. 13 by substituting the value of $R_{max}$ with the higher layer configured parameter al-Repetition-CSS-Paging.

For Type2-NPDCCH common search space, the aggregation and repetition levels defining the search spaces and the corresponding monitored NPDCCH candidates are listed in Table 16.6-3 in FIG. 14 by substituting the value of $R_{max}$ with the higher layer configured parameter npdcch-Max-NumRepetitions-RA.

The locations of starting subframe are given by $k=k_D$ where $K_D$ is the th consecutive NB-IoT DL subframe from subframe, and $b = \mu \cdot R$, and $$u = 0, 1, \ldots, \frac{R_{max}}{R} - 1,$$

and where
subframe is a subframe satisfying the condition $$(10n_f + \lfloor n_s/2 \rfloor) \bmod T = \alpha_{offset} \cdot T, \text{ where } T = R_{max} \cdot G$$

for NPDCCH UE-specific search space,
G is given by the higher layer parameter nPDCCH-startSF-UESS,
$\alpha_{offset}$ is given by the higher layer parameter nPDCCH-startSFoffset-UESS,
for NPDCCH Type2-NPDCCH common search space,
G is given by the higher layer parameter nPDCCH-startSF-Type2CSS, $α_{offset}$ is given by the higher layer parameter nPDCCH-startSFoffset-Type2CSS, For Type1-NPDCCH common search space, k=k0 and is determined from locations of NB-IoT paging opportunity subframes.

If the UE is configured by high layers with a PRB for monitoring of NPDCCH UE-specific search space, the UE shall monitor the NPDCCH UE-specific search space on the higher layer configured PRB, the UE is not expected to receive NPSS, NSSS, NPBCH on the higher layer configured PRB.

otherwise, the UE shall monitor the NPDCCH UE-specific search space on the same PRB on which NPSS/NSSS/NPBCH are detected.

If a NB-IoT UE detects NPDCCH with DCI Format N0 ending in subframe n, and if the corresponding NPUSCH format 1 transmission starts from n+k, the UE is not required to monitor NPDCCH in any subframe starting from subframe n+1 to subframe n+k−1.

If a NB-IoT UE detects NPDCCH with DCI Format N1 or N2 ending in subframe n, and if the corresponding NPDSCH transmission starts from n+k, the UE is not required to monitor NPDCCH in any subframe starting from subframe n+1 to subframe n+k−1.

If a NB-IoT UE detects NPDCCH with DCI Format N1 ending in subframe n, and if the corresponding NPUSCH format 2 transmission starts from subframe n+k, the UE is not required to monitor NPDCCH in any subframe starting from subframe n+1 to subframe n+k−1.

If a NB-IoT UE detects NPDCCH with DCI Format N1 for "PDCCH order" ending in subframe n, and if the corresponding NPRACH transmission starts from subframe n+k, the UE is not required to monitor NPDCCH in any subframe starting from subframe n+1 to subframe n+k−1.

If a NB-IoT UE has a NPUSCH transmission ending in subframe n, the UE is not required to monitor NPDCCH in any subframe starting from subframe n+1 to subframe n+3.

A NB-IoT UE is not required to monitor NPDCCH candidates of an NPDCCH search space if an NPDCCH candidate of the NPDCCH search space ends in subframe n, and if the UE is configured to monitor NPDCCH candidates of another NPDCCH search space starting before subframe n+5.

The present disclosure proposes a method of configuring an NPDCCH search space or an MPDCCH search space for supporting SC-PTM of a BL/CE terminal and an NB-IoT terminal.

Particularly, the present disclosure proposes a method of defining a search space for transmitting a NPDCCH or an MPDCCH. Herein, the search space is configured with MPDCCH candidates or NPDCCH candidates, and the NPDCCH or MPDCCH is i) CRC-scrambled based on an SC-RNTI for transmitting PDSCH scheduling information for transmission of SC-MCCH information for transmission of SC-PTM related control information or ii) CRC-scrambled based on an SC-N-RNTI that notifies of a change of an SC-MCCH.

According to a method of transmitting SC-MCCH information for a typical LTE terminal, a SC-PTM service applied LTE terminal can acquire scheduling information for a PDSCH that transmits an SC-MCCH, by receiving DCI CRC-scrambled based on an SC-RNTI and an SC-N-RNTI through a CSS of the PDCCH. However, in a case of a BL/CE terminal and an NB-IoT terminal, reception of the corresponding PDCCH is not possible.

Therefore, when the SC-PTM is supported for a BL/CE terminal and an NB-IoT terminal, it is necessary to separately configure an MPDCCH search space and an NPDCCH search space for enabling the BL/CE terminal and the NB-IoT terminal to receive DCI for transmission of scheduling information for the PDSCH that transmits the SC-MCCH.

The present disclosure proposes a method of configuring an MPDCCH search space and an NPDCCH search space for enabling a BL/CE terminal and an NB-IoT terminal to receive scheduling information for a PDSCH including an SC-MCCH.

Method 1. A Method of Transmitting SC-MCCH Scheduling Control Information Through a Type-1 Common Search Space (CSS)

It may be defined as follows: a base station/cell/TRP i) performs CRC-scrambling on DCI including scheduling information for an SC-MCCH for providing an SC-PTM service and DCI including notification information for a change of the SC-MCCH, by using an SC-RNTI and an SC-N-RNTI, respectively, and ii) transmits the CRC-scrambled DCI through the type-1 common search space including MPDCCH candidates or NPDCCH candidates, which is for transmitting DCI including scheduling information for a paging message for BL/CE terminals and NB-IoT terminals.

In this case, it may be defined that the SC-PTM service applied BL/CE/NB-IoT terminals perform blind decoding for the MPDCCH candidates or the NPDCCH candidates constituting the type-1 CSS defined for the corresponding terminal, based on the SC-RNTI and the SC-N-RNTI as well as a P-RNTI.

That is, in a case of DCI including PDSCH scheduling control information for the SC-MCCH, the DCI may be CRC-scrambled based on the SC-RNTI and transmitted through the NPDCCH or the MPDCCH of the corresponding type-1 CSS, and each of the BL/CE terminal and the NB-IoT terminal may receive scheduling control information for the corresponding SC-MCCH by monitoring the type-1 CSS.

Also, the 8-bit bitmap information for notification of the change of the SC-MCCH is CRC-scrambled based on the SC-N-RNTI and transmitted through the NPDCCH or the MPDCCH of the corresponding type-1 CSS. Each of the BL/CE terminal and the NB-IoT terminal may receive the notification of the change of the SC-MCCH by monitoring the type-1 CSS.

However, when scheduling control information for the SC-RNTI-based SC-MCCH is transmitted through the type-1 CSS, it may be defined to use a DCI format defined for paging (that is, DCI format 6-2 in a case of the BL/CE terminal, and DCI format N2 in a case of the NB-IoT terminal) in the same way, as a DCI format for the transmission of the scheduling control information for the SC-RNTI-based SC-MCCH.

Alternatively, when scheduling control information for the SC-RNTI-based SC-MCCH is transmitted through the type-1 CSS, it may be defined to use a DCI format different from the DCI format defined for paging. For example, it may be defined to transmit the MPDCCH scrambled by a corresponding SC-RNTI based on DCI format 6-1A or DCI format 6-1B in a case of the BL/CE terminal, and to transmit the NPDCCH scrambled by a corresponding SC-RNTI based on DCI format N1 in a case of the NB-IoT terminal.

Likewise, even in a case where the MPDCCH or the NPDCCH, that is CRC-scrambled based on the SC-N-RNTI and transmitted in order to notify of a change of the SC-MCCH through the type-1 CSS, it may be defined to use the DCI format defined for paging (that is, DCI format 6-2 in a case of the BL/CE terminal, and DCI format N2 in a case of the NB-IoT terminal) in the same way.

Alternatively, when notification information for the change of the SC-RNTI-based SC-MCCH is transmitted through the type-1 CSS, it may be defined to use a DCI format different from the DCI format defined for paging. For example, it may be defined to transmit the MPDCCH scrambled by a corresponding SC-RNTI based on DCI format 6-1A or DCI format 6-1B in a case of the BL/CE terminal, and to transmit the NPDCCH scrambled by a corresponding SC-RNTI based on DCI format N1 in a case of the NB-IoT terminal.

Method 2. A Method of Defining a Separate CSS

A type-3 CSS, an SC-SS, or a group search space (GSS) for transmitting DCI including scheduling control information for an SC-MCCH may be further defined in addition to a type-0 CSS, a type-1 CSS, a type-2 CSS, and a USS, which are defined for the BL/CE terminal and the NB-IoT terminal.

In this case, RRC parameters for configuring the type-3 CSS (or SC-SS or GSS) may be transmitted through cell-specific RRC signaling.

Hereinafter, a method of configuring a separate CSS (or SC-SS or GSS) for the NB-IoT terminal according to an embodiment will be described.

In a case of a type-3 NB-IoT terminal, a corresponding type-3 CSS (SC-SS or GSS) may be configured by i) separately defining: a parameter for configuring a value of a maximum number of repetition transmission times of NPDCCH, npdcch-MaxNumRepetitions-SCPTM; a G value configuration parameter for defining a start subframe, nPDCCH-startSF-Type3CSS; and an $\alpha_{offset}$ value configuration parameter, nPDCCH-startSFoffset-Type3CSS, ii) transmitting the defined parameters through UE-specific RRC signaling or cell-specific RRC signaling, and iii) applying the transmitted parameters to an existing NPDCCH search space configuration expression.

Alternatively, the corresponding type-3 CSS (SC-SS or GSS) may be configured by: i) applying, as a value of a maximum number of repetition transmission times of NPDCCH, an RRC parameter value configured for paging, al-Repetition-CSS-Paging; ii) separately defining a G value configuration parameter for defining a start subframe, nPDCCH-startSF-Type3CSS, and an $\alpha_{offset}$ value configuration parameter, nPDCCH-startSFoffset-Type3CSS; iii) transmitting the parameters through UE-specific RRC signaling or cell-specific RRC signaling; and iv) applying the parameters to an existing NPDCCH search space configuration expression.

Alternatively, it may be defined i) to separately define a parameter for configuring a value of a maximum number of repetition transmission times of NPDCCH, npdcch-MaxNumRepetitions-SCPTM, for configuring the type-3 CSS (SC-SS or GSS and transmit the defined parameter through UE-specific RRC signaling or cell-specific RRC signaling, and ii) to determine a subframe constituting the corresponding type-3 CSS (SC-SS or GSS) by an RRC parameter for the SC-PTM configuration, which includes sc-mcch-RepetionPeriod-r13, sc-mcch-Offset-r13, sc-mcch-FirstSubframe-r13, sc-mcch-duration-r13, and sc-mcch-ModificationPeriod-r13.

Alternatively, it may be defined i) to apply an RRC parameter value configured for paging, al-Repetition-CSS-Paging, as a value of a maximum number of repetition transmission times of NPDCCH, for configuring the type-3 CSS (SC-SS or GSS), and ii) to determine a subframe constituting the type-3 CSS (SC-SS or GSS) by RRC parameters for the SC-PTM configuration, which includes sc-mcch-RepetionPeriod-r13, sc-mcch-Offset-r13, sc-mcch-FirstSubframe-r13, sc-mcch-duration-r13, and sc-mcch-ModificationPeriod-r13.

Hereinafter, a method of configuring a separate CSS (or SC-SS or GSS) for the BL/CE terminal according to another embodiment will be described.

As another method of defining a separate type-3 CSS, an SC-SS, or a group search space (GSS), in a case of the BL/CE terminal, allocation information of a PRB constituting an MPDCCH set for configuring the type-3 CSS (or SC-SS or GSS) may be transmitted through UE-specific RRC signaling or cell-specific RRC signaling.

In addition, the type-3 CSS (or an SC-SS or GSS) may be further configured by i) separately defining a parameter for configuring a value of a maximum number of repetition transmission times of MPDCCH, mPDCCH-NumRepetition-SCPTM, and a G value configuration parameter for defining a start subframe, mPDCCH-startSF-CSS-SCPTM, and ii) transmitting the defined parameters through UE-specific RRC signaling or cell-specific RRC signaling.

Alternatively, the type-3 CSS (or an SC-SS or GSS) may be configured by: i) applying, as a value of a maximum number of repetition transmission times of MPDCCH, an RRC parameter value configured for paging, mPDCCH-NumRepetition-Paging; ii) separately defining only a G value configuration parameter for defining a start subframe, mPDCCH-startSF-CSS-SCPTM; and iii) transmitting the parameters through UE-specific RRC signaling or cell-specific RRC signaling.

Alternatively, it may be defined i) to separately define a parameter for configuring a value of a maximum number of repetition transmission times of MPDCCH, mPDCCH-NumRepetition-SCPTM, and ii) to transmit the defined parameter through UE-specific RRC signaling or cell-specific RRC signaling, and iii) to determine a subframe constituting the corresponding type-3 CSS (or an SC-SS or GSS) by an RRC parameter for the SC-PTM configuration, which includes sc-mcch-RepetionPeriod-r13, sc-mcch-Offset-r13, sc-mcch-FirstSubframe-r13, sc-mcch-duration-r13, and sc-mcch-ModificationPeriod-r13.

Alternatively, it may be defined i) to apply an RRC parameter value configured for paging, mPDCCH-NumRepetition-Paging, as a value of a maximum number of repetition transmission times of MPDCCH, for configuring the corresponding type-3 CSS (or an SC-SS or GSS), and ii) to determine a subframe constituting the type-3 CSS (or an SC-SS or GSS) by an RRC parameter for the SC-PTM configuration, which includes sc-mcch-RepetionPeriod-r13, sc-mcch-Offset-r13, sc-mcch-FirstSubframe-r13, sc-mcch-duration-r13, and sc-mcch-ModificationPeriod-r13.

Further, it may be defined to apply an MPDCCH transmission mode of a distributed type to an MPDCCH set for configuring the corresponding type-3 CSS (or an SC-SS or GSS).

Further, the present disclosure proposes a method of configuring an MPDCCH search space or an NPDCCH search space for transmitting or receiving allocation information for a PDSCH including an SC-MCCH that is a multicasting control channel. However, the method may be applied, in the same way, to configuration of a search space for transmitting an SC-MTCH that is a multicasting data channel, by replacing the SC-RNTI or the SC-N-RNTI with a G-RNTI.

Figure 16:
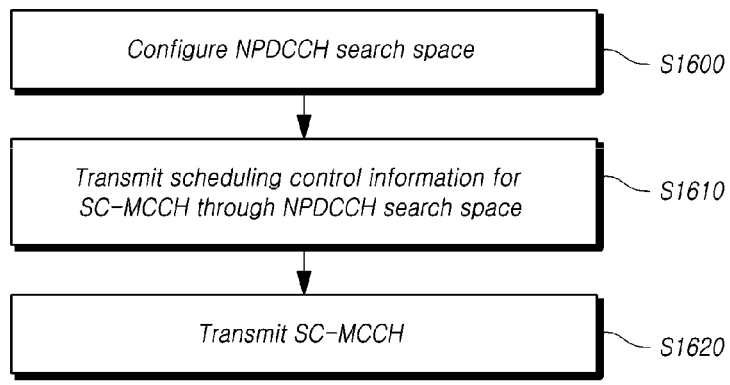

FIG. 15 and FIG. 16 are diagrams illustrating a method of transmitting or receiving a multicasting control channel for an NB-IoT terminal. FIG. 15 shows a method of receiving a multicasting control channel by an NB-IoT terminal, and FIG. 16 shows a method of transmitting a multicasting control channel for an NB-IoT terminal by a base station.

Referring to FIG. 15, an NB-IoT terminal receives configuration information relating to an NPDCCH search space that is separately configured to receive scheduling control information for a multicasting control channel from a base station at step S1500.

As described, the NPDCCH search space is separately configured to receive scheduling control information for the multicasting control channel. Such a NPDCCH search space may be a search space defined separately in addition to predefined search spaces.

That is, the NPDCCH search space may be a search space defined additionally and separately from the type-1 common search space for paging, the type-2 common search space for a random access procedure, and a UE-specific search space for transmitting or receiving UE-specific data, which are defined as NPDCCH search spaces.

The configuration information relating to the separately configured NPDCCH search space may include a maximum number of repetition transmission times of the NPDCCH, a start subframe configuration parameter, and an offset parameter, which are for configuring the NPDCCH search space.

The configuration information associated to this NPDCCH search space may be received through higher layer signaling.

The NB-IoT terminal receives, from the base station, scheduling control information for a multicasting control channel through the NPDCCH search space configured based on the received configuration information at step S1510.

The NB-IoT terminal checks a resource for multicasting control channel transmission and receives a multicasting control channel, based on scheduling control information received through the separately defined NPDCCH search space at step S1520.

Referring to FIG. 16, a base station configures a separate NPDCCH search space for transmitting scheduling control information for a multicasting control channel for an NB-IoT terminal at step S1600.

The separately configured NPDCCH search space may be a search space separately defined for transmission or reception of scheduling control information for the multicasting control channel in addition to a type-1 common search space, a type-2 common search space, and a UE-specific search space, which are predefined NPDCCH search spaces.

The base station transmits configuration information of the separately defined NPDCCH search space to the NB-IoT, and transmits scheduling control information for the multicasting control channel through the NPDCCH search space at step S1610.

Here, the base station may transmit the configuration information relating to the separately defined NPDCCH search space through higher layer signaling.

Further, the configuration information relating to the separately defined NPDCCH search space may include a maximum number of repetition transmission times of NPDCCH and a start subframe configuration parameter, and an offset parameter, which are for configuring the NPDCCH search space.

The base station transmits the multicasting control channel based on scheduling control information transmitted through the separately defined NPDCCH search space to the NB-IoT terminal at step S1620.

Therefore, according to the present embodiments, a multicasting control channel for an NB-IoT terminal may be transmitted or received by configuring an NPDCCH search space separately configured in addition to predefined NPDCCH search spaces, and transmitting or receiving scheduling control information for the multicasting control channel through the separately defined NPDCCH search space.

Figure 17:
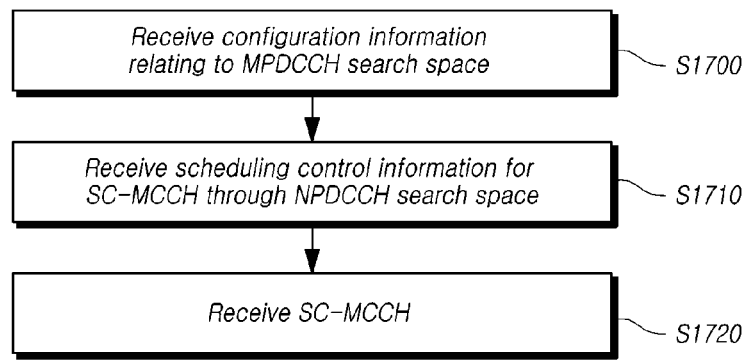
FIG. 17 and FIG. 18 are diagrams illustrating a method for transmitting or receiving a multicasting control channel for a BL/CE terminal.
Figure 18:
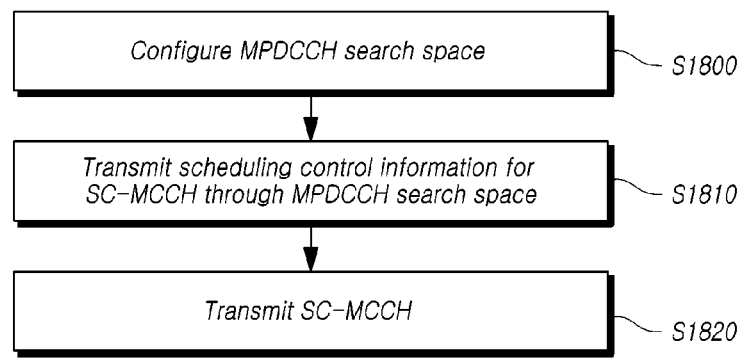

FIG. 17 and FIG. 18 are diagrams illustrating a method for transmitting or receiving a multicasting control channel for a BL/CE terminal according to the present embodiments. FIG. 17 shows a method of receiving a multicasting control channel by a BL/CE terminal, and FIG. 18 shows a method of transmitting a multicasting control channel for a BL/CE terminal by a base station.

Referring to FIG. 17, a BL/CE terminal receives configuration information relating to an MPDCCH search space separately configured to receive scheduling control information for a multicasting control channel from a base station at step S1700.

Here, the MPDCCH search space separately configured to receive scheduling control information for the multicasting control channel may be a search space separately defined in addition to predefined MPDCCH search spaces.

That is, the separately configured MPDCCH search space may be a search space defined additionally and separately from a search space defined to perform monitoring only when the BL/CE terminal is configured with CEModeA, a search space for paging, a search space for a random access procedure, and a search space for transmitting or receiving UE-specific data.

The configuration information relating to the MPDCCH search space received from the base station may include a maximum number of repetition transmission times of MPDCCH and a start subframe configuration parameter, which are for configuring the MPDCCH search space.

Further, the configuration information relating to the separately configured MPDCCH search space may be received through higher layer signaling.

The BL/CE terminal receives scheduling control information for the multicasting control channel through the separately configured MPDCCH search space S1710. Here, the MPDCCH that transmits scheduling control information for the multicasting control channel may be transmitted in a distributed type.

The BL/CE terminal receives the multicasting control channel transmitted based on the scheduling control information at step S1720.

Referring to FIG. 18, a base station configures a separate MPDCCH search space for transmitting scheduling control information for a multicasting control channel for a BL/CE terminal at step S1800.

The separately configured MPDCCH search space may be a search space defined additionally and separately from predefined MPDCCH search spaces. That is, the separately configured MPDCCH search space may be a search space defined additionally and separately from a search space defined to perform monitoring only when the BL/CE terminal is configured with CEModeA, a search space for paging, a search space for a random access procedure, and a UE-specific search space.

The base station transmits configuration information relating to the separately configured MPDCCH search space, and transmits scheduling control information for the multicasting control channel through the separately configured MPDCCH search space, to the terminal at step S1810.

The configuration information relating to the separately configured MPDCCH search space may include a maximum number of repetition transmission times of MPDCCH and a start subframe configuration parameter, which are for configuring the MPDCCH search space, and may be transmitted through higher layer signaling.

Further, the MPDCCH that transmits scheduling control information for the multicasting control channel may be transmitted in a distributed type.

The base station transmits the multicasting control channel based on scheduling control information transmitted through the separately configured MPDCCH search space at step S1820.

Therefore, according to present embodiments, transmission or reception of a multicasting control channel for a BL/CE terminal may be performed by additionally defining an MPDCCH search space in addition to predefined MPDCCH search spaces and transmitting scheduling control information for the multicasting control channel through the additionally defined MPDCCH search space.

Figure 19:
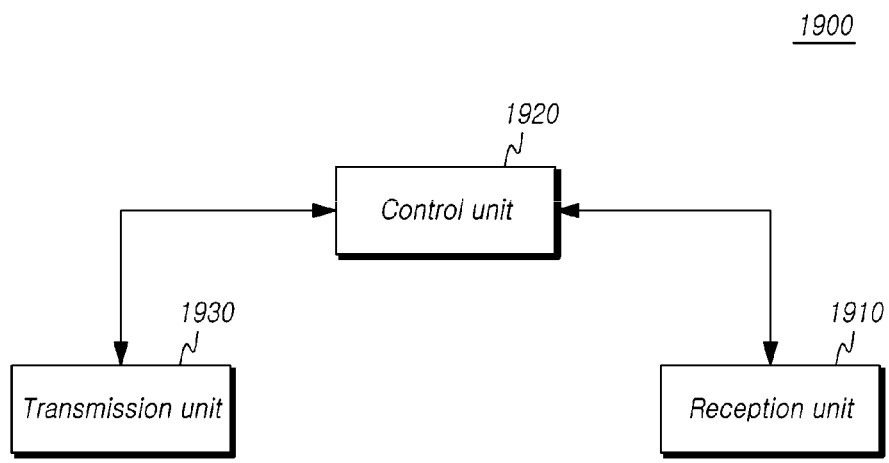
FIG. 19 is a diagram illustrating a user equipment according to an embodiment.

FIG. 19 is a diagram illustrating a configuration of a user equipment 1900 according to the present embodiments.

Referring to FIG. 19, the user equipment 1900 according to the present embodiments includes a reception unit 1910, a control unit 1920, and a transmission unit 1930.

The reception unit 1910 receives downlink control information, data, and a message through a corresponding channel from a base station.

Further, according to the present disclosure described above, the control unit 1920 configures a search space for transmitting or receiving scheduling control information for a multicasting control channel for an MTC terminal and an NB-IoT terminal, and controls an overall operation of the user equipment 1900 based on transmission or reception of the multicasting control channel.

The transmission unit 1930 transmits uplink control information, data, and a message through a corresponding channel to the base station.

Figure 20:
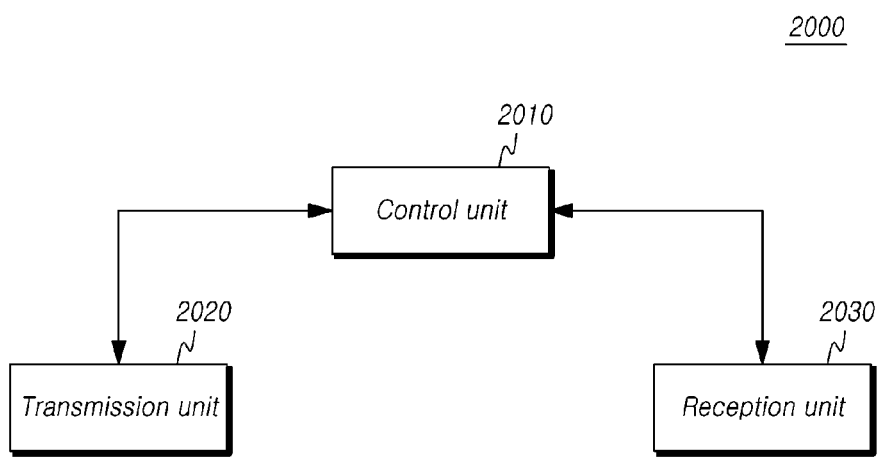
FIG. 20 is a diagram illustrating a base station according to an embodiment.

FIG. 20 is a diagram illustrating a configuration of a base station 2000 according to the present embodiments.

Referring to FIG. 20, the base station 2000 according to the present embodiments includes a control unit 2010, a transmission unit 2020, and a reception unit 2030.

According to the present disclosure described above, the control unit 2010 configures a search space for transmitting or receiving scheduling control information for a multicasting control channel for an MTC terminal and an NB-IoT terminal, and controls an overall operation of the base station 2000 based on based on transmission or reception of the multicasting control channel.

The transmission unit 2020 and the reception unit 2030 are used for transmitting or receiving a signal, a message, and data necessary for performing the aforementioned present disclosure to or from the terminal.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed based on the accompanying claims in such a manner that all of the technical ideas included within the scope equivalent to the claims belong to the present disclosure.

What is claimed is:

1. A method of receiving a multicasting control channel (SC-MCCH) by a Bandwidth reduced Low complexity/Coverage Enhancement (BL/CE) terminal, the method comprising:
    receiving configuration information of a machine type communication physical downlink control channel (MPDCCH) search space from a base station, wherein the MPDCCH search space is separately configured to enable the BL/CE to receive scheduling control information for the multicasting control channel;
    receiving the scheduling control information for the multicasting control channel through the MPDCCH search space configured based on the configuration information; and
    receiving the multicasting control channel based on the scheduling control information,
    wherein the configuration information is received through higher layer signaling,
    wherein the MPDCCH search space is a search space configured separately from i) a search space defined to perform monitoring only when the BL/CE terminal is configured with CEModeA, ii) a search space for paging, iii) a search space for a random access procedure, and iv) a search space for transmitting or receiving UE-specific data, and
    wherein the configuration information includes a maximum number of repetition transmission times of Narrowband Physical Downlink Control Channel (NPDCCH), a start subframe configuration parameter for defining a start subframe for the NPDCCH search space, and an offset parameter for defining an offset for the NPDCCH search space, which are for configuring the NPDCCH search space, and the BL/CE terminal performs blind decoding of the NPDCCH based on the maximum number of repetition transmission times of the NPDCCH, the start subframe configuration parameter, and the offset parameter.

2. The method of claim 1, wherein an MPDCCH that transmits the scheduling control information for the multicasting control channel is transmitted in a distributed type.

3. A method of a base station for transmitting a multicasting control channel for a Bandwidth reduced Low complexity/Coverage Enhancement (BL/CE) terminal, the method comprising:
    configuring a separate machine type communication physical downlink control channel (MPDCCH) search space for transmitting scheduling control information for the multicasting control channel;
    transmitting configuration information of the MPDCCH search space to the BL/CE terminal;
    transmitting the scheduling control information for the multicasting control channel through the MPDCCH search space; and
    transmitting the multicasting control channel based on the scheduling control information,
    wherein the configuration information of the MPDCCH search space is transmitted through higher layer signaling,
    wherein the MPDCCH search space is a search space configured separately from i) a search space defined to perform monitoring only when the BL/CE terminal is configured with CEModeA, ii) a search space for paging, iii) a search space for a random access procedure, and iv) a search space for transmitting or receiving UE-specific data, and wherein the configuration information includes a maximum number of repetition transmission times of Narrowband Physical Downlink Control Channel (NPDCCH), a start subframe configuration parameter for defining a start subframe for the NPDCCH search space, and an offset parameter for defining an offset for the NPDCCH search space, which are for configuring the NPDCCH search space, and the BL/CE terminal performs blind decoding of the NPDCCH based on the maximum number of repetition transmission times of the NPDCCH, the start subframe configuration parameter, and the offset parameter.

4. The method of claim 3, wherein an MPDCCH that transmits the scheduling control information for the multicasting control channel is transmitted in a distributed type.

5. A Bandwidth reduced Low complexity/Coverage Enhancement (BL/CE) terminal configured to receive a multicasting control channel, the BL/CE terminal comprising:
   a reception unit configured to receive configuration information of a machine type communication physical downlink control channel (MPDCCH) search space from a base station, wherein the MPDCCH is separately configured to enable the BL/CE terminal to receive scheduling control information for the multicasting control channel; and
   a control unit configured to check the scheduling control information for the multicasting control channel through the MPDCCH search space configured based on the configuration information, and control reception of the multicasting control channel based on the scheduling control information,
   wherein the configuration information is received through higher layer signaling,
   wherein the MPDCCH search space is a search space configured separately from i) a search space defined to perform monitoring only when the BL/CE terminal is configured with CEModeA, ii) a search space for paging, iii) a search space for a random access procedure, and iv) a search space for transmitting or receiving UE-specific data, and
   wherein the configuration information includes a maximum number of repetition transmission times of Narrowband Physical Downlink Control Channel (NPDCCH), a start subframe configuration parameter for defining a start subframe for the NPDCCH search space, and an offset parameter for defining an offset for the NPDCCH search space, which are for configuring the NPDCCH search space, and the BL/CE terminal performs blind decoding of the NPDCCH based on the maximum number of repetition transmission times of the NPDCCH, the start subframe configuration parameter, and the offset parameter.

6. The BL/CE terminal of claim 5, wherein an MPDCCH that transmits the scheduling control information for the multicasting control channel is transmitted in a distributed type.

7. A base station configured to transmit a multicasting control channel for a Bandwidth reduced Low complexity/Coverage Enhancement (BL/CE) terminal, the base station comprising:
   a control unit configured to configure a separate machine type communication physical downlink control channel (MPDCCH) search space for transmitting scheduling control information for the multicasting control channel, and control transmission of configuration information of the MPDCCH search space and the scheduling control information for the multicasting control channel through the MPDCCH search space; and
   a transmission unit configured to transmit the multicasting control channel based on the scheduling control information,
   wherein the MPDCCH search space is a search space configured separately from i) a search space defined to perform monitoring only when the BL/CE terminal is configured with CEModeA, ii) a search space for paging, iii) a search space for a random access procedure, and iv) a search space for transmitting or receiving UE-specific data, and
   wherein the configuration information includes a maximum number of repetition transmission times of Narrowband Physical Downlink Control Channel (NPDCCH), a start subframe configuration parameter for defining a start subframe for the NPDCCH search space, and an offset parameter for defining an offset for the NPDCCH search space, which are for configuring the NPDCCH search space, and the BL/CE terminal performs blind decoding of the NPDCCH based on the maximum number of repetition transmission times of the NPDCCH, the start subframe configuration parameter, and the offset parameter.

8. The base station of claim 7, wherein an MPDCCH that transmits the scheduling control information for the multicasting control channel is transmitted in a distributed type.

* * * * *